No. 657,555. Patented Sept. 11, 1900.
S. LUBIN.
KINETOGRAPHIC FILM.
(Application filed Apr. 16, 1900.)

(No Model.)

WITNESSES:

INVENTOR
S. Lubin
BY
C. N. Butler
ATTORNEY

UNITED STATES PATENT OFFICE.

SIEGMUND LUBIN, OF PHILADELPHIA, PENNSYLVANIA.

KINETOGRAPHIC FILM.

SPECIFICATION forming part of Letters Patent No. 657,555, dated September 11, 1900.

Application filed April 16, 1900. Serial No. 13,066. (No specimens.)

*To all whom it may concern:*

Be it known that I, SIEGMUND LUBIN, residing in the city of Philadelphia, State of Pennsylvania, have invented an Improvement in Films for Life-Motion Pictures, of which the following is a specification.

This improvement is a film for life-motion pictures in which the longitudinal edges are made thicker than the inner portion for the purpose of producing a structure that will not tear in the operation of feeding, while permitting the use of a very thin transparent ground, rendering the definition of the pictures thereon clear and distinct, and for the further purposes of preventing the pictures on the film from being scratched in passing through the apparatus and of obviating stretching and vibration.

Figure 1:
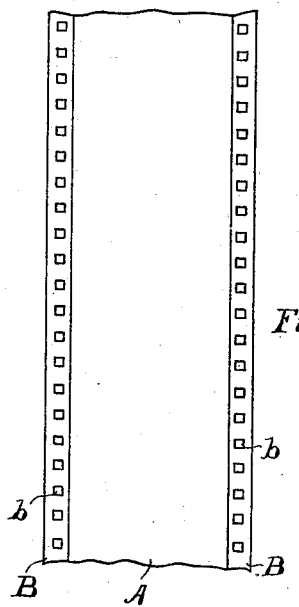
Figure 2:
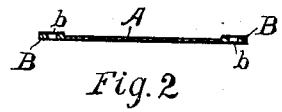

In the accompanying drawings, Figure 1 is a plan view of a section of film embodying my invention. Fig. 2 is a transverse sectional view thereof; and Fig. 3 is a longitudinal sectional view of a film, showing a modified form of my invention.

As shown in the drawings, the inner portion A of the film is thin, while the edges B, having the holes *b* therethrough, are relatively thick. The film being made of transparent material, as celluloid or a substance of similar qualities, and the clearness of definition of the pictures displayed thereon depending upon its degree of transparency, it is highly important that the ground should be very thin in order to increase the transparency, and as it is necessary to feed the ribbon-like film rapidly through the apparatus by means of which the pictures are displayed sufficient strength is required, so that the sprockets which engage the holes in the edges to feed the film may not stretch or tear it. It is also important that sufficient strength and rigidity be provided to prevent vibration. In guiding the film through the apparatus there has heretofore been a tendency to scratch the pictures through their close-moving contact with the tension-plate, and it is therefore important to provide means for protecting them from this effect by causing the ground and the pictures thereon to stand off from contact with such parts of the apparatus as may injure the pictures. All of the foregoing difficulties are obviated by forming the film, as in my improvement, of a thin body portion with thick edges, affording strength with transparency, preventing stretching and vibration, and protecting the pictures by removing them from contact with parts of the apparatus while traveling therethrough.

Figure 3:
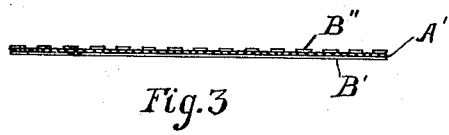

The features illustrated in Fig. 3 may be employed in place of the construction shown in Figs. 1 and 2, this modification showing the section of the body portion A' provided at its edges with the raised strip B' and the blocks or sectioned strip B'', which may be employed for feeding the film in place of the holes and also for keeping the body of the film and the pictures thereon from contact with parts of the apparatus. It will be understood that the strip B' may be omitted.

It is preferred to mold or roll the film as a solid jointless ribbon; but the construction may be produced by gluing or otherwise attaching strips upon the edges to thicken the same, whether on one or both faces.

Having described my invention, I claim as new and desire to secure by Letters Patent—

1. A film for life-motion pictures comprising a ribbon having a thin, transparent ground or inner portion for receiving the picture and thicker, perforated edges, for the purposes set forth, said parts forming a flexible, integral body without joint, substantially as specified.

2. A film for life-motion pictures, comprising a flexible ribbon having a thin ground for receiving the pictures, raised edges for protecting said ground portion, and means for engaging feeding mechanism, substantially as specified and for the purposes set forth.

In testimony whereof I have hereunto set my hand, in the presence of the subscribing witnesses, this 13th day of April, 1900.

SIEGMUND LUBIN.

Witnesses:
  J. J. FRAWLEY,
  THOMAS S. GATES.